United States Patent [19]

Roynberg

[11] Patent Number: 5,272,861

[45] Date of Patent: Dec. 28, 1993

[54] ROTARY AGRICULTURAL TOOL

[75] Inventor: Erling Roynberg, Naerbo, Norway

[73] Assignee: Kverneland Underhaug AS, Naerbo, Norway

[21] Appl. No.: 836,349

[22] PCT Filed: Sep. 12, 1990

[86] PCT No.: PCT/GB90/01408

§ 371 Date: Mar. 3, 1992

§ 102(e) Date: Mar. 3, 1992

[87] PCT Pub. No.: WO91/03925

PCT Pub. Date: Apr. 4, 1991

[30] Foreign Application Priority Data

Sep. 18, 1989 [GB] United Kingdom ........... 8921118
Dec. 18, 1989 [GB] United Kingdom ........... 8928499
Jun. 27, 1990 [GB] United Kingdom ........... 9014293

[51] Int. Cl.⁵ .................. A01D 34/52; A01F 29/06; B02C 13/04

[52] U.S. Cl. ...................... 56/504; 56/294; 172/91; 241/194

[58] Field of Search ........... 56/12.7, 289, 294, 504; 241/101.7, 194, 243, 605; 172/91, 123

[56] References Cited

U.S. PATENT DOCUMENTS

| | | | |
|---|---|---|---|
| 2,515,268 | 7/1987 | Seaman | 172/96 |
| 2,813,684 | 11/1957 | Jensen | 241/194 |
| 2,841,946 | 7/1958 | Skromme et al. | 56/289 |
| 3,309,854 | 3/1967 | Mitchell et al. | 56/504 |
| 4,211,060 | 7/1980 | Rhodes | 56/294 |
| 4,706,761 | 11/1987 | Herscher et al. | 172/42 |
| 4,804,047 | 2/1989 | Kobashi et al. | 172/91 |

FOREIGN PATENT DOCUMENTS

| | | |
|---|---|---|
| 182122 | 5/1986 | European Pat. Off. . |
| 2453171 | 5/1975 | Fed. Rep. of Germany ........ 56/294 |
| 3339804 | 5/1984 | Fed. Rep. of Germany . |
| 3631485 | 3/1988 | Fed. Rep. of Germany . |
| 1497080 | 8/1967 | France . |
| 8705186 | 9/1987 | World Int. Prop. O. . |

Primary Examiner—David J. Bagnell
Attorney, Agent, or Firm—Merchant, Gould, Smith, Edell, Welter & Schmidt

[57] ABSTRACT

A rotary agricultural tool which may be incorporated in a number of different types of agricultural equipment, such as in a device for chopping up bulk material is disclosed. The rotary tool has an elongate cutter body mounted in a frame for rotation about a substantially horizontal axis and carrying on its outer periphery pivotally mounted cutter blades, a housing extending partly around the cutter body, and feed rollers for feeding the bulk material to the cutter body. The blades are arranged in pairs of blades. Each blade is mounted in position on the cutter body in such a way that: the blade is pivotable relative to its mounting between an outwardly extending operative chopping position and in inoperative position; the radially inner end of the blade is engageable with a stop in order to define the operative position; the general axis of the blade extends through the pivotal mounting and in a direction which is rearwardly inclined to a radius passing from the center of the elongated body and through the pivotal mounting with respect to the normal direction of rotation of the cutter body. A retarding device is coupled with the blade and tends to maintain the blade in any particular angular position about its pivotal mounting unless the blade is acted upon by a turning moment about its pivotal mounting which is in excess of a predetermined minimum turning moment determined by the retarding device.

18 Claims, 9 Drawing Sheets

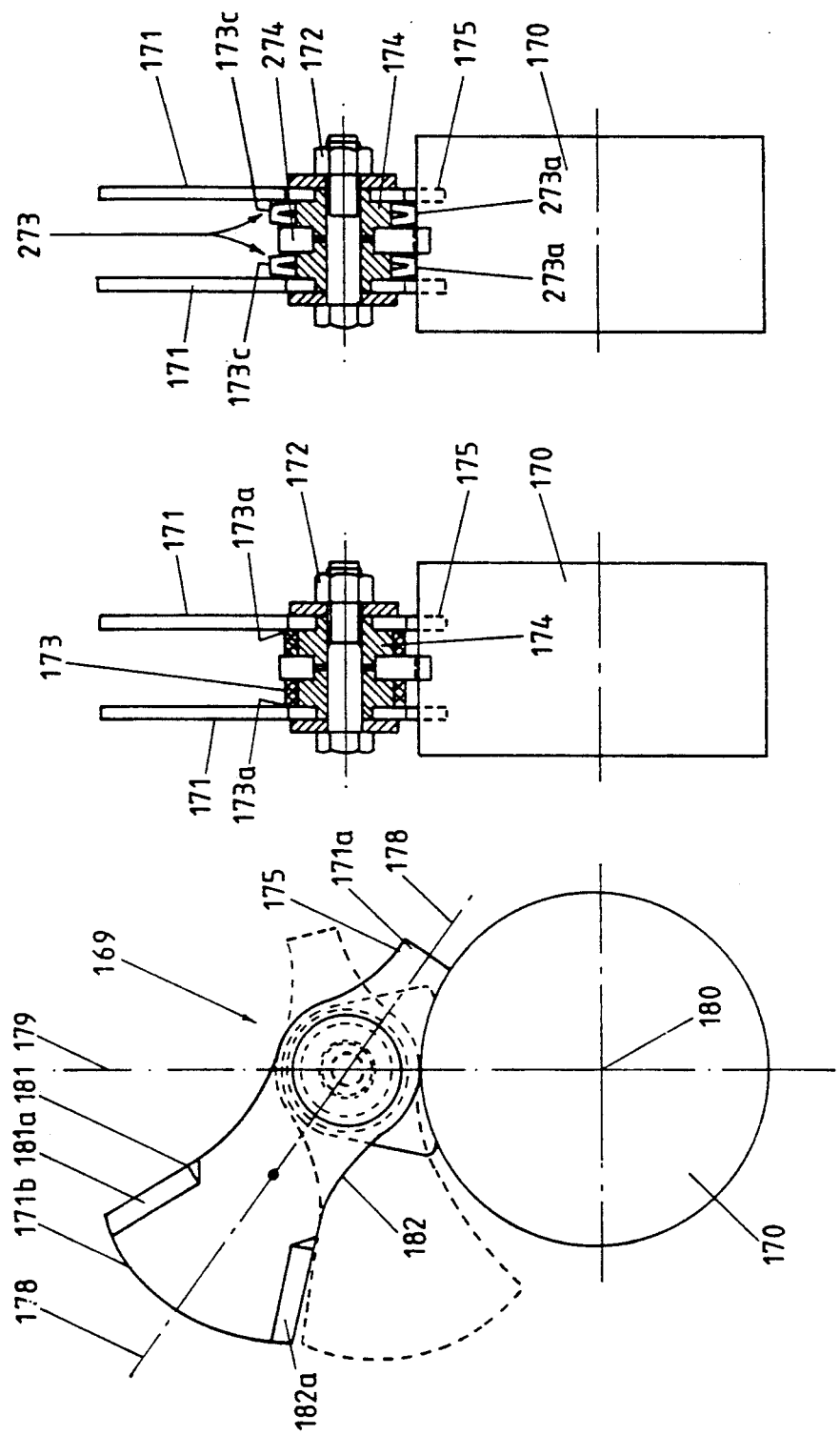

ROTARY AGRICULTURAL TOOL

This invention relates to a rotary agricultural tool which comprises an open-sided housing, an elongate bladecarrying body rotatable in said housing, and a plurality of blades arranged along the length of the body for rotation therewith, the blades being moveable through the open side of the housing in order to carry out a working operation on material to be worked by the tool.

The invention is particularly concerned with a tool having an arrangement of blades which are pivotally mounted on the outer periphery of the body and which each extends generally radially outwardly of the axis of rotation of the body. The outer tips or edges of the blades are flung radially outwardly under centrifugal action upon rotation of the body, and therefore can apply a substantial flail-type action on the material to be worked. However, if any serious obstruction or obstacle is encountered by each blade, the latter can yield to some extent by moving on its pivot, and thereby preventing damage being done to the tool.

Rotary agricultural tools of this general type can be used in order to chop-up bulk material e.g. long stem baled material into short lengths, such as long stem animal feed material, to render the chopped material suitable for feeding to farm animals. The rotary tool therefore may be mounted in the base of a hopper e.g. as disclosed in more detail in WO 87/05186. Alternatively, the rotary tool may be mounted in a slot in a base of a rotary drum type of bale shredder.

However, the rotary agricultural tool of the invention can be mounted in other types of agricultural equipment in order to carry out a working operation. Thus, the rotary tool may be incorporated in a soil cultivator, a forage harvester, a grass cutter, a pick-up machine for picking-up already cut crop material e.g. grass, hay or straw lying on the ground and for chopping-up such picked-up material, or a hedge cutter.

Common to all of these pieces of equipment will be an open sided housing, a blade-carrying body or shaft rotatable in the housing, and a plurality of blades arranged along the length of the body and pivotally mounted on the outer periphery thereof, in which each blade can extend in a plane extending generally radially outwardly of the axis of rotation of the body, and the free ends of which can be flung radially outwardly under centrifugal action upon rotation of the body.

The flail type of working action of the blades of the rotary tool is advantageously employed in carrying out the working operation of each machine in which the rotary tool is mounted, but in existing machines has the disadvantage of generating substantial noise during start-up and also during slowing-down of the rotation of the body, and this also generates substantial wear on the working edges of the blades. Thus, by virtue of the pivotal mounting of the blades, both the leading and the trailing edges of the blades can make substantial impact with the outer periphery of the body during start-up and during slowing-down. This therefore requires frequent replacement of worn blades, as well as causing unacceptable wear or damage to the outer periphery of the blade-carrying body over a period of time.

A further feature of existing blade designs is that the blades are freely pivotally mounted on the outer periphery of the blade carrying body, and therefore tend to take up a working position, under centrifugal action, in which the axis of symmetry of each blade extends radially outwardly of the axis of the body. Therefore, given that each blade is freely pivoted at one end, and its opposite end moves out under centrifugal action to take up a position radially outwardly of the pivot, the centre of gravity of the blade is located substantially on this radial line. Therefore, immediately the blade encounters any substantial resistance e.g. makes contact with unduly dense material, the blade will pivot rearwardly about its pivot with respect to the direction of rotation of the body, and thereby reduce the chopping or cutting effect given by the blade to the material.

Also, since the blades of existing machine are freely pivotally mounted, they have to be made with substantial mass so as to have sufficient rotational energy to chop-up dense material without pivoting rearwardly on their pivots. If the blades have insufficient mass, they will be liable to pivot in a rearward direction about their pivots (when the tool is rotating) even when they are engaging relatively light weight material.

Evidently, the use of very massive blades (and suitably robust mountings associated therewith) increases the cost of manufacture, and also noise generation and wear of the components.

The present invention therefore seeks to provide an improved design of chopper blade for use in a rotary agricultural tool which can be as effective, if not more so, than existing designs of blades, but with a smaller mass of the blades, and which is operable in such a way as to impart an improved working action on the material which is less liable to cause yieldable movement of the blade about its pivot.

According to the invention there is provided a rotary agricultural tool which comprises:

an open-sided housing;

an elongate blade-carrying body rotatable in said housing;

a plurality of blades arranged along the length of the body; and pivotal mountings arranged along the outer periphery of the body and on which the blades are mounted, with each blade having a first end and a second end, and at least the second ends being moveable through the open side of the housing upon rotation of the body in order to carry out a working operation;

each blade being mounted on the body in such a way that:

1. the blade is pivotal relative to its mounting between an outwardly extending operative position in which the second end of the blade is located radially outwardly of the first end, and an inoperative position;

2. the blade is pivotal outwardly under centrifugal action to the operative position, and the first end of the blade is engagable with a stop in order to define the operative position; and, 3. the general axis of the blade extends through the pivotal mounting and in a direction which is rearwardly inclined to a radius passing from the centre of the body and through the pivotal mounting, with respect to the operative direction of rotation of the body;

characterised in that a retarding device is coupled with each blade and which tends to maintain the blade in any particular angular position about its pivotal mounting unless the blade is acted upon by a turning moment about its pivotal mounting which is in excess of a predetermined minimum turning moment set by the retarder device.

A rotary agricultural tool according to the invention may be used to chop up long stem material, and may be incorporated in a hopper type bale chopper, or in a drum type bale chopper. However, the invention is not restricted to such use, and the rotary agricultural tool of the invention may be used in other types of agricultural equipment having an open sided housing, and through which at least parts of the blade are moveable upon rotation of the body in order to carry out a working operation. The rotary agricultural tool therefore may be incorporated in a soil cultivator, a forage harvester, a grass cutter, a pick-up device or a hedge cutter.

Therefore, in any piece of agricultural apparatus in which the rotary tool of the invention is incorporated, by virtue of the geometry of the mounting of each blade and the procession of the retarding device, an improved working action is obtained, and substantially without generation of noise, and yet in a way which enables the blade to pivot under the action of a turning moment in excess of a predetermined minimum. The blade will therefore be able to pivot against the action of its retarding device from the inoperative position to the operative position under centrifugal action when the body is rotated (assuming that the blade happens to be in its inoperative position initially), but can pivot to its inoperative position if the blade meets any excessive resistance.

Also, since the retarding device associated with each blade is able to apply resistance to pivotal movement of each blade, this increases the chopping action which each blade can exert, since this resistance will be additional to the tendency of the blade to maintain its extended operative position under centrifugal action. Therefore, as compared with existing (massive) designs of pivotally mounted chopper blades, the blades of a rotary tool of the invention can be made of lighter weight while still functioning as effectively as the more massive existing design of blades.

The retarding device therefore allows slower pivotal movement of the blade under centrifugal action or upon impact, but otherwise maintains the blade in any particular position and without generation of clanking noises when the machine starts-up or it stops.

Furthermore, by arranging for the general axis of the blade to be rearwardly inclined in the operative position, the effective centre of mass of the blade is located outwardly of the pivotal mounting and will tend to urge the blade against the stop, and this will therefore store-up rotational energy in the blade which will be available to apply substantial impacts on the material to be worked.

Preferably, the first end of the blade is formed as a nose which engages with the outer periphery of the cutter body in order to define the operative position, and this limits the extent of outward pivoting of the blade under centrigufal action. This therefore prevents the leading (cutting) edges of the blades swinging into damaging contact with the outer periphery of the cutter body, which would cause blunting of the blade edges over a period of time.

Preferably, sets of blades are arranged at longitudinal spacings throughout the length of a generally cylindrical cutter body, and with angular spacings between successive sets of blades, as seen in end view.

Also, it is preferred to arrange the design of each blade to be such that it can be reversibly mounted in the tool when its leading edge becomes worn.

Each set of blades may comprise a pair of blades mounted on a common pivot, and the retarder device may be formed by a bush fitted on the common pivot and located between the two blades, and with the end faces of the bush making frictional contact with the blades in order to retard the pivotal movement of the blades. The degree of retardation can be set to meet any particular requirements by adjusting the extent of axial compression of the bush by the blades.

Preferably, the bush is made of resiliently deformable material, and a threaded fastener may form the common pivot, and which can be tightened in order to clamp the blades and the bush together.

In an alternative construction, the retarding device is formed by a spring arrangement arranged on the common pivot and making frictional contact with each pair of blades so as to resist rotation of the blades on the common pivot. In one preferred arrangement, a pair of Belleville springs may be arranged on the common pivot, one on either side of a central abutment, and each acting against the inside face of the respective blade.

Embodiments of agricultural tool according to the invention will now be described in detail, by way of example only, with reference to the accompanying drawings, in which:

FIG. 2 is a side view, to an enlarged scale, of one of the chopper blades of the tool shown in FIG. 1;

FIG. 3a is an end view of the set of chopper blades, and also showing one construction of retarding device for resisting pivoting movement of the blades;

FIG. 3b is a view, similar to FIG. 3a, of a further construction of retarding device;

Figure 1:
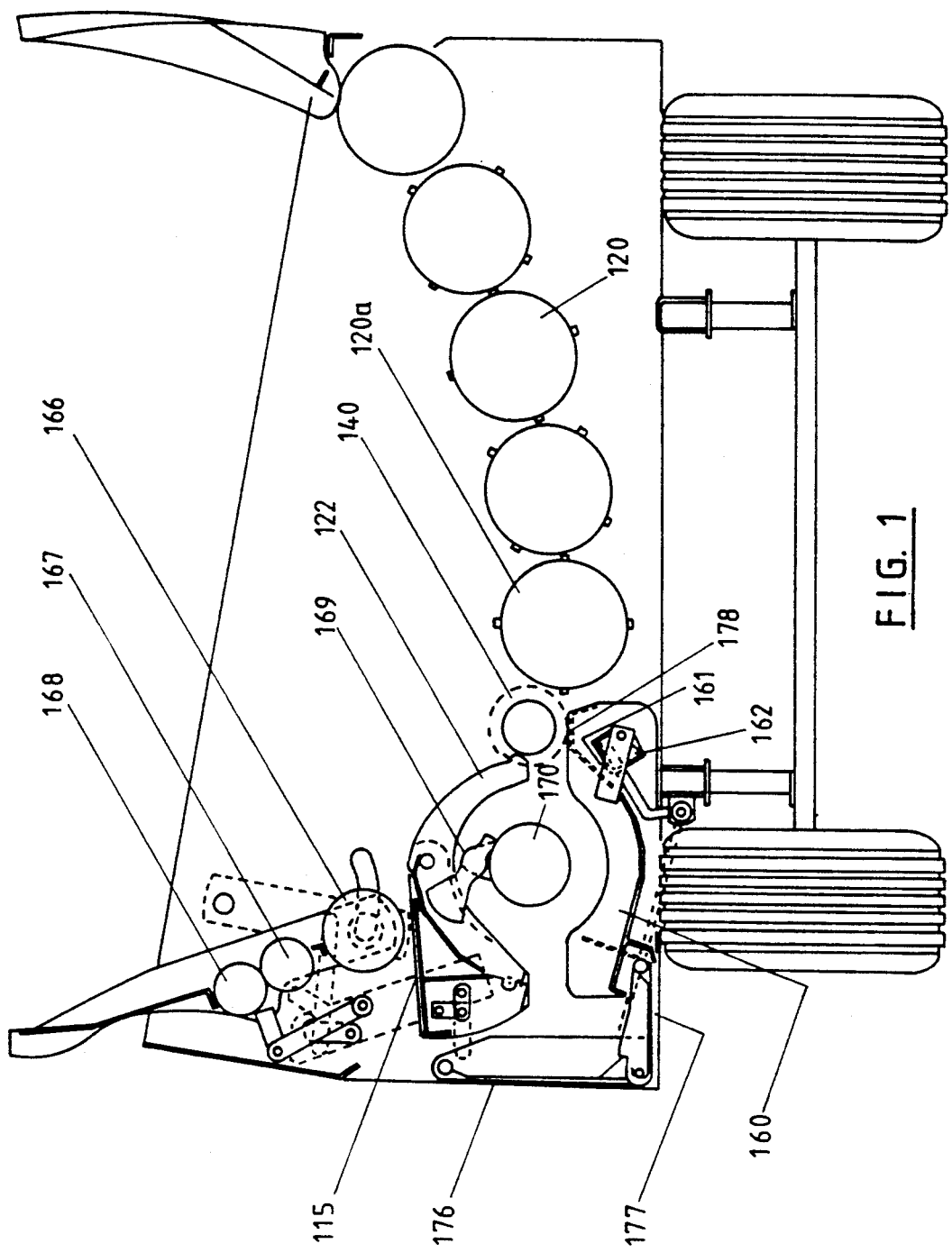
FIG. 1 is a detail end view of a rotary agricultural tool according to the invention, which is incorporated in a hopper type bale chopping or shredding apparatus.

Referring now to FIG. 1 of the drawings, there is shown a bale chopping device incorporating a rotary agricultural tool according to the invention, and which comprises a cylindrical carrier drum 170 which is rotatable about a horizontal axis in an open-sided housing 115, and which carries rotary cutter blades 169 which are pivotally mounted on the outer periphery of the drum 170, and which are arranged throughout the length of the drum, and at angular spacings between successive blades.

An adjustable grill 122 comprises longitudinally spaced grill bars which are adjustable bodily together in order to vary the extent of projection of the cutter blades 169, through the spaces between the bars. In addition, a set of lower cutter teeth 161 is mounted on a carrier 162 arranged below the drum 170, and the teeth 161 can be linearly reciprocated between a position in which the blades 161 project through a lower housing wall 160 and into the path of the chopped material, and a withdrawn position in which the tips of the blades 161 do not project beyond the housing wall 160. The cutter teeth 161 can be moved jointly between the two positions, according to the material which is being handled, and the material then is conveyed to an outlet which can be opened or closed by operation of a movable back plate 176. The back plate 176 is a hinged construction which can be pivoted outwardly, but has a lower portion 177 which can be used to direct the discharge of the chopped material e.g. downwardly into a cattle feeding trough.

Feed rollers 120 rotate and forwardly convey bulk material towards the grill 122 so as to undergo a chopping action by the cutter blades 169 acting in conjunction with the grill bars. Between the downstream feed roller 120a and the entrance to the rotary drum 170, there is arranged a star toothed feed roller 140, which assists in the feeding of the material which is to undergo chopping.

Above the housing 115 which partly surrounds the drum 170, there is arranged a large lowermost control roller 166, and a cooperating pair of upper control rollers 167 and 168, all carried on a swing arm, and which can be adjusted inwardly and outwardly to suit the instantaneous size of any particular bale which is being handled, in order to control the feeding of the bale periphery to the grill 122 according to variations in height of the instantaneous centre of rotation of the bale.

The embodiment of chopping device shown in FIG. 1 has a novel arrangement of chopper blade sets (169) and which will now be described in more detail below, with reference to FIGS. 2 and 3a and 3b.

The chopper blades 169 are arranged in sets of blades, which are spaced apart longitudinally along the outer periphery of the drum 170, and with angular separation between successive sets of blades, as seen in end view. Each set of blades comprises a pair of blades 171, as can be seen particular from FIG. 3a. Reference 169 designates generally a set of chopper blades, and this comprises a pair of blades 171 which are mounted on a common pivot, and which are rigidly coupled together by means of a fastener 172 which forms the pivot, and a bush 173 made of resiliently deformable material which is located between the two blades 171. Each blade 171 has a first end 171a which is radially innermost in the operative position, and a second end 171b which is radially outermost. The bush 173 is secured to the outer periphery of a carrier sleeve 174 which is non-rotatably mounted, and this arrangement normally maintains the blades generally parallel to each other.

During rotation of the drum 170 in the direction of the arrow, the blades 171 adopt the operative position shown in full lines in FIG. 2, and it should be noted that the blades do not extend radially outwardly, but are rearwardly inclined with respect to the direction of rotation of the drum 170. It has been found that this gives an improved chopping action on the bulk material, and particularly long stem animal feed material, by reason of the large amount of rotational energy which is stored in the blade arrangements by virtue of the mass and inertia of the blades.

As indicated above, the bush 173 is located between the blades 171, and therefore its end faces 173a make frictional contact with the blades 171, so as to resist the tendency for the blades 171 to pivot about their pivotal mounting. The degree of retardation provided by this frictional contact will depend upon the extent of compression applied to clamp the blades 171 and the bush 173 together, by tightening of the fastener 172.

The arrangement of the blades 171 and the bush 173 therefore functions as a retarding device which can tend to maintain the blades in any particular angular position about the pivotal mounting unless each blade is acted upon by a turning moment about its pivotal mounting which is in excess of a predetermined minimum turning moment determined by the retarding device.

Therefore, by virtue of the geometry of the mounting of each blade 171, an improved chopping action is obtained, and substantially without generation of noise, and yet in a way which enables the blade to pivot under the action of a turning moment in excess of a predetermined minimum, which will apply when the drum 170 is rotated, by reason of centrifugal action, assuming that the blade happens to be in its inoperative position initially. However, each blade can pivot to its inoperative position if the blade meets any excessive resistance when it is chopping-up the bulk material, which will be permitted under the controlled yielding of the retarding device.

The retarding device therefore allows pivotal movement of each blade under these conditions, but otherwise maintains each blade in any particular position and without generation of clanking noises when the machine starts-up or is stopped.

Also, in view of the resistance to rotation of the blades on their pivots which is provided by the retarding devices, this increases the chopping action and therefore lighter weight blades can be used than existing freely pivotable arrangements of chopper blades, and with the same effect. Conversely, for the same mass of chopper blades, the retarding devices can increase the chopping action, in addition to that available under centrifugal action.

The particular inclination adopted by each blade, when in the operative position shown in full lines in FIG. 2, provides an advantageous chopping-action, for reasons which are now set out. FIG. 2 shows in full lines an outwardly extending operative chopping position of a blade set 169, and in this position the general longitudinal axis 178 of each blade extends through the pivotal mounting in a direction which is rearwardly inclined to a radius 179 passing from the centre 180 of the drum 170 and through the pivotal mounting, with respect to the normal direction of rotation of the drum 170.

By this arrangement, the effective centre of mass M of each blade is located outwardly of the pivotal mounting (172) and therefore tends to urge each blade in a clockwise direction, and also stores-up substantial rotational energy which is available to apply substantial chopping impacts on the bulk material.

The operative position of each blade is determined by engagement of a nose portion 175 (which forms said first end 171a of each blade) with the outer periphery of the drum 170, and this arrangement effectively provides a stop or abuttment which engages with the radially inner end (175) of each blade in order to define the operative position.

By reason of this engagement of the nose 175 with the outer periphery of the drum 170, there is no risk of the leading cutting edge 181 of each blade continuing to pivot in a clockwise direction so as to come into contact with the outer periphery of the drum 170, and thereby cause generation of noise, and eventually blunting of the cutting edges.

The inoperative position of each blade is shown in dashed lines in FIG. 2, and each blade can take-up this position when an excessive force engages the leading edge of each blade e.g. when a potential blockage of material takes place, and each blade can then move to an inoperative position against the retarding action of the bush 173, by anti-clockwise pivoting until the trailing edge 182 lies alongside the outer periphery of the drum 170. Advantageous chopping action may be obtained by providing in-turned edges 181a and 181b long the edges 181 and 182.

FIG. 3a shows one construction of a retarding device for use with each pair of blades 171, and in the form of compressed rubber bush 173 which makes frictional contact via its end faces 173a with the inside faces of the blades 171. This is just one example of a retarding device which may be provided in the invention, and a further construction is shown in FIG. 3b. Parts corresponding with those already described are designated by the same reference numerals, and will not be described in detail again.

In the embodiment of FIG. 3b, a spring arrangement designated generally by reference 273 is mounted on carrier sleeve 174. The blades 171 are capable of pivoting on reduced diameter ends of the carrier sleeve 174, in similar manner to that shown in FIG. 3a, but carrier sleeve 174 remains fixed, and the spring arrangement 273 is fixedly mounted on the carrier sleeve 174.

The spring arrangement 273 is arranged to retard pivotal motion of the blades 171, for the same purpose as described above in respect of bush 173. The spring arrangement 273 also makes frictional engagement with the facing inner sides of the blades 171. In the illustrated arrangement of FIG. 3b, the spring arrangement 273 comprises an arrangement of a pair of Belleville spring sets 273a, which react between a central circular flange 274 mounted on sleeve 174, and the inside faces of the blades 171. The Belleville spring sets 273a therefore apply axial force between the central flange 274 and the inside faces of the blades 171, whereby frictional retardation is applied to each blade, to resist movement of each blade about its pivot. However, when the rotational force applied to each blade exceeds the frictional resistance, the blades will be able to move e.g. when the blades make impact with substantial mass of material, so that the blades tend to move towards the position shown in dotted outline in FIG. 2, or to move under centrifugal action from the dotted line position shown in FIG. 2 back to the operative position.

The illustrated embodiment of blades shown in FIGS. 1 to 3 therefore provide the following features in a rotary agricultural according to the invention:

(i) Each blade is pivotable relative to its mounting between an outwardly extending operative chopping position and an inoperative position, and is moveable through the open side of a housing of the tool when in the operative position:

(ii) The radially inner end of the blade is engageable with a stop in order to define the operative position;

(iii) The general axis of the blade extends through the pivotal mounting in a direction which is rearwardly inclined to a radius passing from the centre of the elongate body and through the pivotal mounting, with respect to the normal direction of rotation of the cutter body; and, (iv) A retarding device is coupled with each blade and which tends to maintain the blade in any particular angular position about its pivotal mounting unless the blade is acted upon by a turning moment about its pivotal mounting which is in excess of a predetermined minimum turning moment determined by the retarding device.

Figure 4:
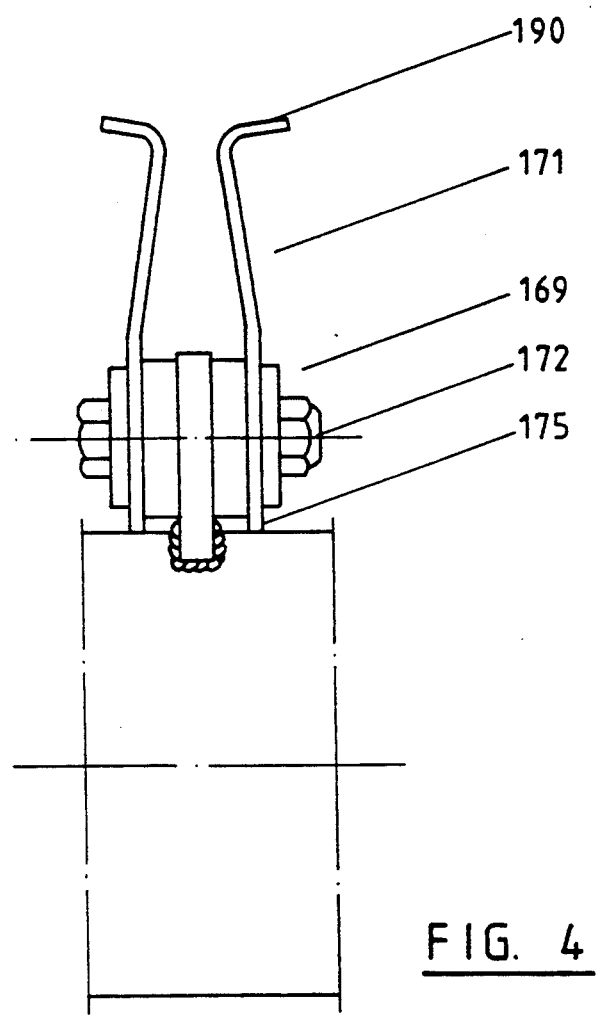
FIG. 4 is an end view of an alternative design of a set of chopper blades.

Alternative designs of blade may be provided to that shown in FIGS. 1 to 3, and a first variant is shown in FIG. 4. Parts corresponding with those already described are designated by the same reference numerals and will not be described in detail again. In FIG. 4, the radially outer ends of the blades 171 are bent over at approximately right angles, to form axially outwardly extending flange portions 190. It has been found that an advantageous working effect can be achieved by incorporating one or more of the types of blades showing in FIG. 4 along the length of the body 170.

Figure 5:
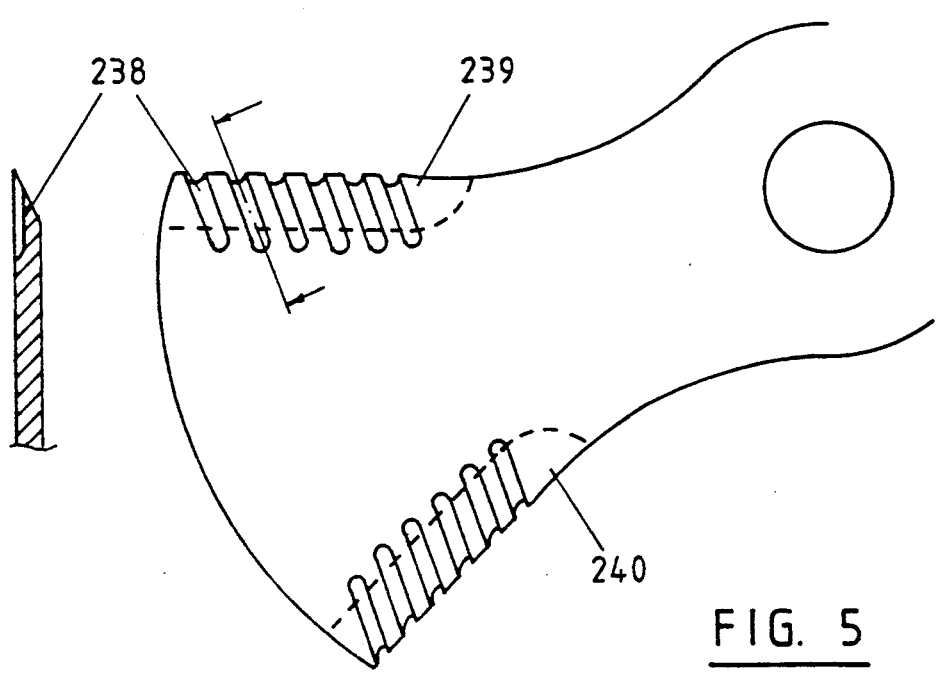
FIG. 5 is a side view of a further design of chopper blade.

A further possible alternative construction is shown in FIG. 5, in which the leading edge 239 and the trailing edge 240 are provided with a saw toothed profiles 238 along their lengths, which can improve the working operation, and particularly the chopping action when the tool is used to chop up long stem material, such as hay, straw or silage.

Figure 9:
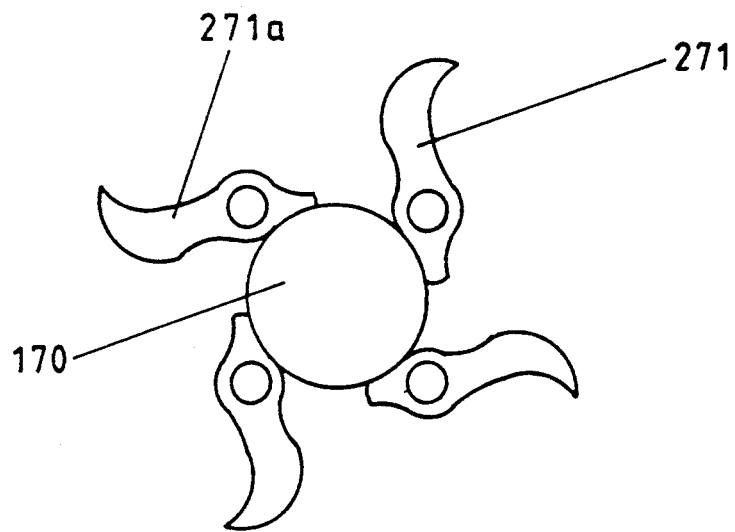
FIG. 9 is a side view of an alternative design of profile of the chopper blades; and, FIGS. 10 to 13 show further types of agricultural machines in which a rotary agricultural tool of the invention can be provided.

Another alternative construction of chopper blade design is shown in FIG. 9, and which shows a different profile for the leading and trailing edges of the chopper blades. Chopper blades 271 are pivotally mounted on the outer periphery of elongate chopper body 170, and the mounting of the blades will be generally as described above for the other embodiments. The leading edge 271a of each blade is generally crescent shaped, and this has been found to be particularly effective in the chopping or cutting of certain types of material. In particular, this profile will be especially useful in connection with the cutting of grass, when a rotary tool according to the invention with this design of chopper blade may be used in a forage harvester.

Figure 6:
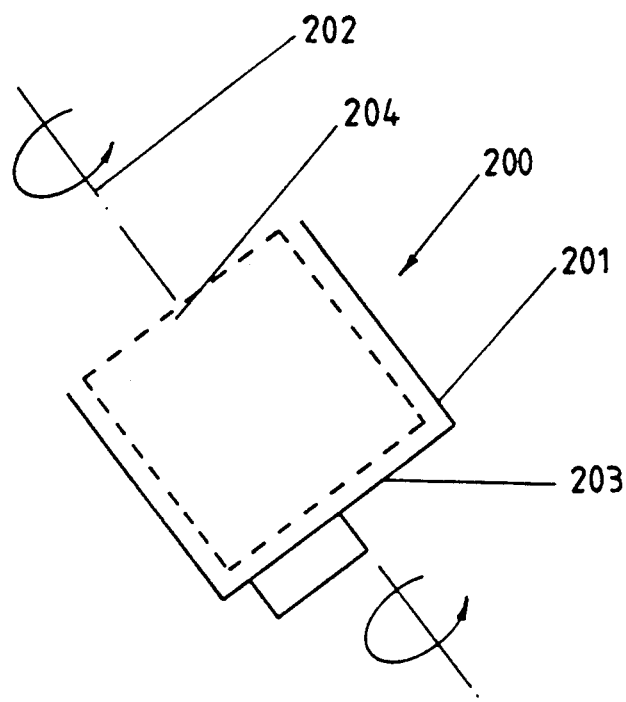
FIG. 6 is a schematic side view of a further type of apparatus in which the rotary tool of the invention may be provided, and taking the form of a drum type of bale shredder.

The rotary agricultural tool described above has been shown in FIG. 1 incorporated in a hopper type of bale chopping or shredding apparatus, and a further type of bale shredder apparatus is shown schematically in FIG. 6. This comprises a drum type of bale shredder apparatus designated generally by reference 200, and comprising a drum 201 which can be adjusted to take up an inclined operative position as shown in FIG. 6, and which is rotatable about axis 202 relative to a fixed base 203. A cylindrical bale 204 is loaded into the drum 201, and the lower end of the bale 204 undergoes a chopping action by means of a rotary agricultural tool which is mounted on the underside of the base 203 as shown in FIG. 7.

Figure 7:
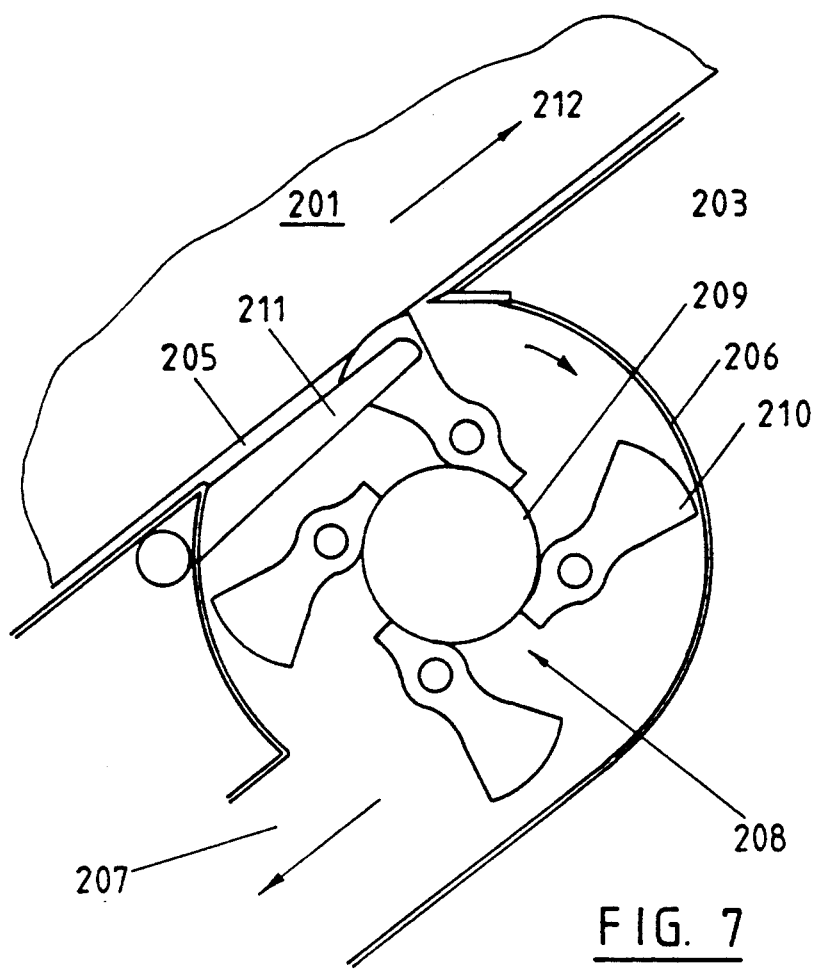
FIG. 7 is a side view of the base of the drum shown in FIG. 6.

FIG. 7 is a detailed view showing schematically the direction in which the material is moved over a slot 205 in the base 203 of the apparatus, so that such material can receive a chopping action upon operation of the rotary tool. The tool therefore comprises an open sided housing 206 which has an inlet in line with the slot 205 in the base 203, and an outlet 207 through which shredded bale material can be discharged. The rotary tool is designated generally by reference 208, and comprises an elongate blade-carrying body 209 and a set of chopper blades 210 mounted pivotally along the outer periphery of the body 209, in generally similar manner to that described above with reference to FIGS. 2 and 3. A grid 211 extends over the inlet to the housing 206 to control the feeding of the material to receive chopping action by the blades.

Figure 8:
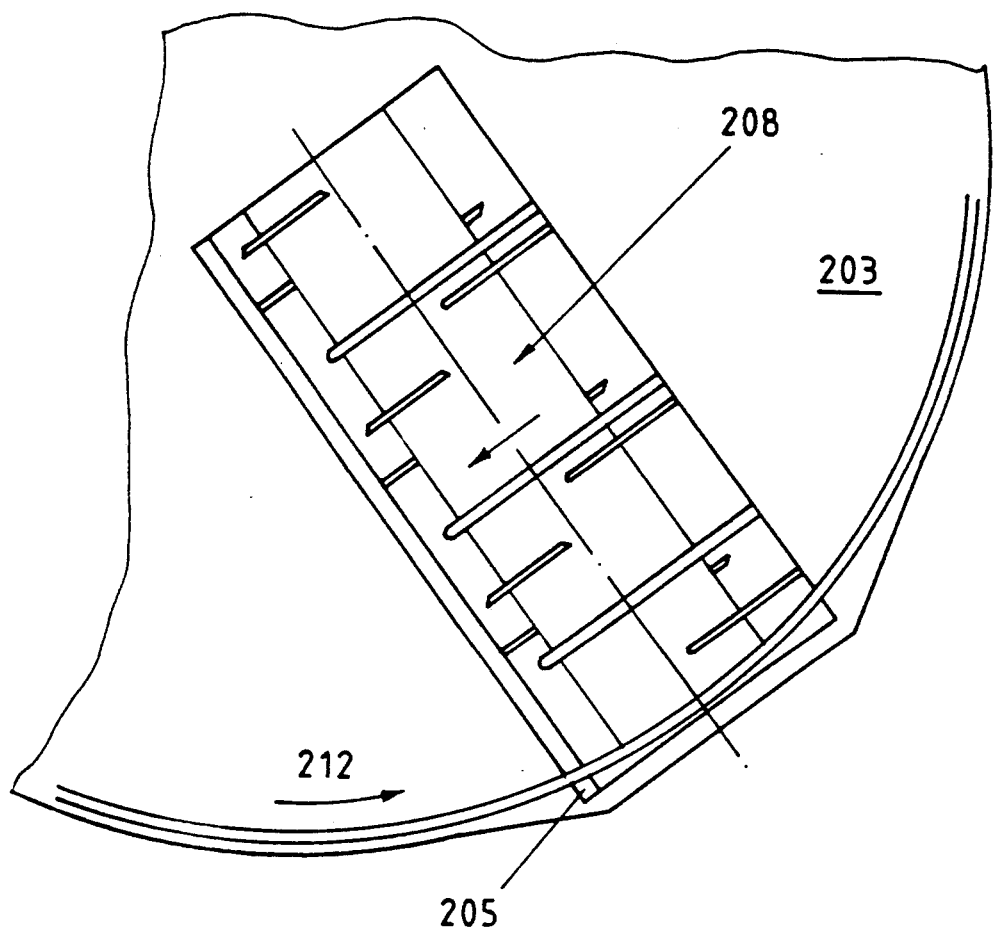
FIG. 8 is a plan view of the base of the drum.

FIG. 8 is a plan view of the base 203 of the drum, and showing the movement of the material in the direction of the arrows 212, over the slot 205 in the base, and counter current to the direction of rotation 213 of the rotary tool 208. However, if desired the relative rotations of the drum and of the rotary tool 208 may be reversed.

The design of the blades is preferably such that they can be reversed on their mountings when the initial leading edge becomes worn or damaged.

Figure 10:
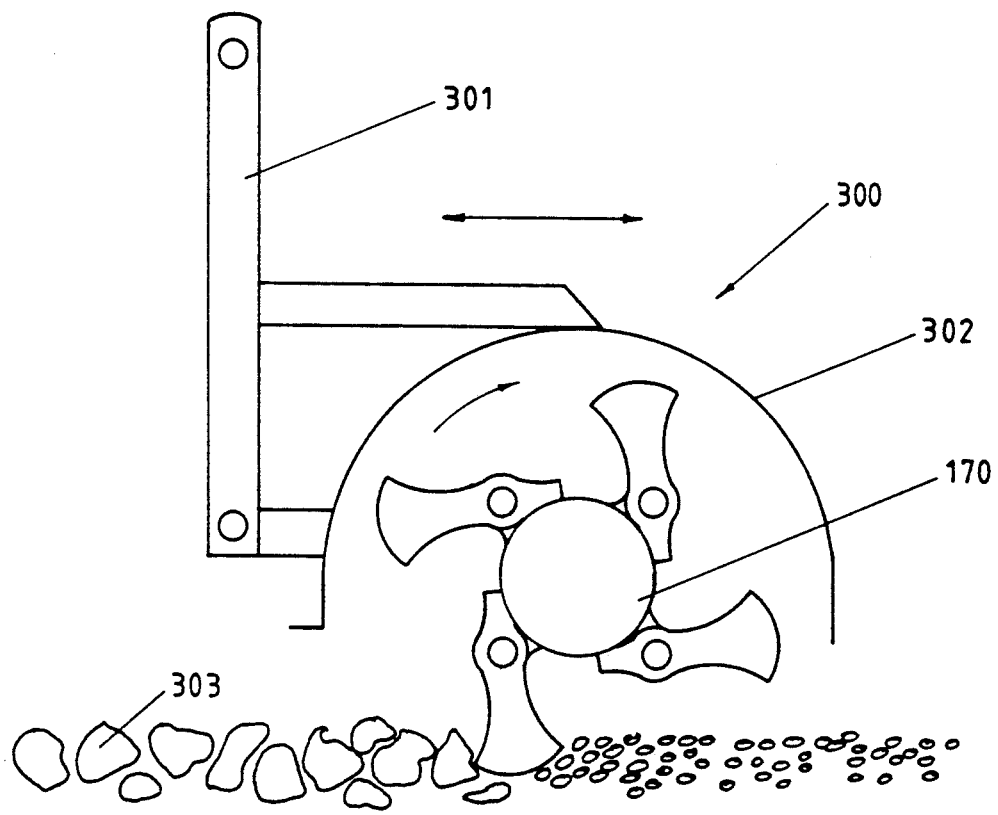

FIGS. 1 and 7 of the drawings show two examples of incorporation of a rotating chopper or cutter body in a rotary agricultural tool, which comprise two different types of device for chopping-up long stem material, such as particularly cylindrical bales of hay, straw or silage. However, the improved chopper blade design may be incorporated in other types of rotary agricultural tool, and further examples are shown in FIGS. 10 to 13 of the drawings. In FIG. 10, a rotating chopper body 170 is rotatably mounted in a rotary soil cultivator which is designated generally by reference 300. The soil cultivator will be mounted behind a tractor or other suitable propelling vehicle via link mechanism 301, and has a generally semi-cylindrical housing 302 which extends over the chopper body, but leaves its underside open and through which the chopper blades are movable in order to carry out a working operation. In the illustrated arrangement, the chopper blades rotate in the direction of the arrow in order to break-down clods of material 303 into small particle sizes, as shown in FIG. 10.

Figure 11:
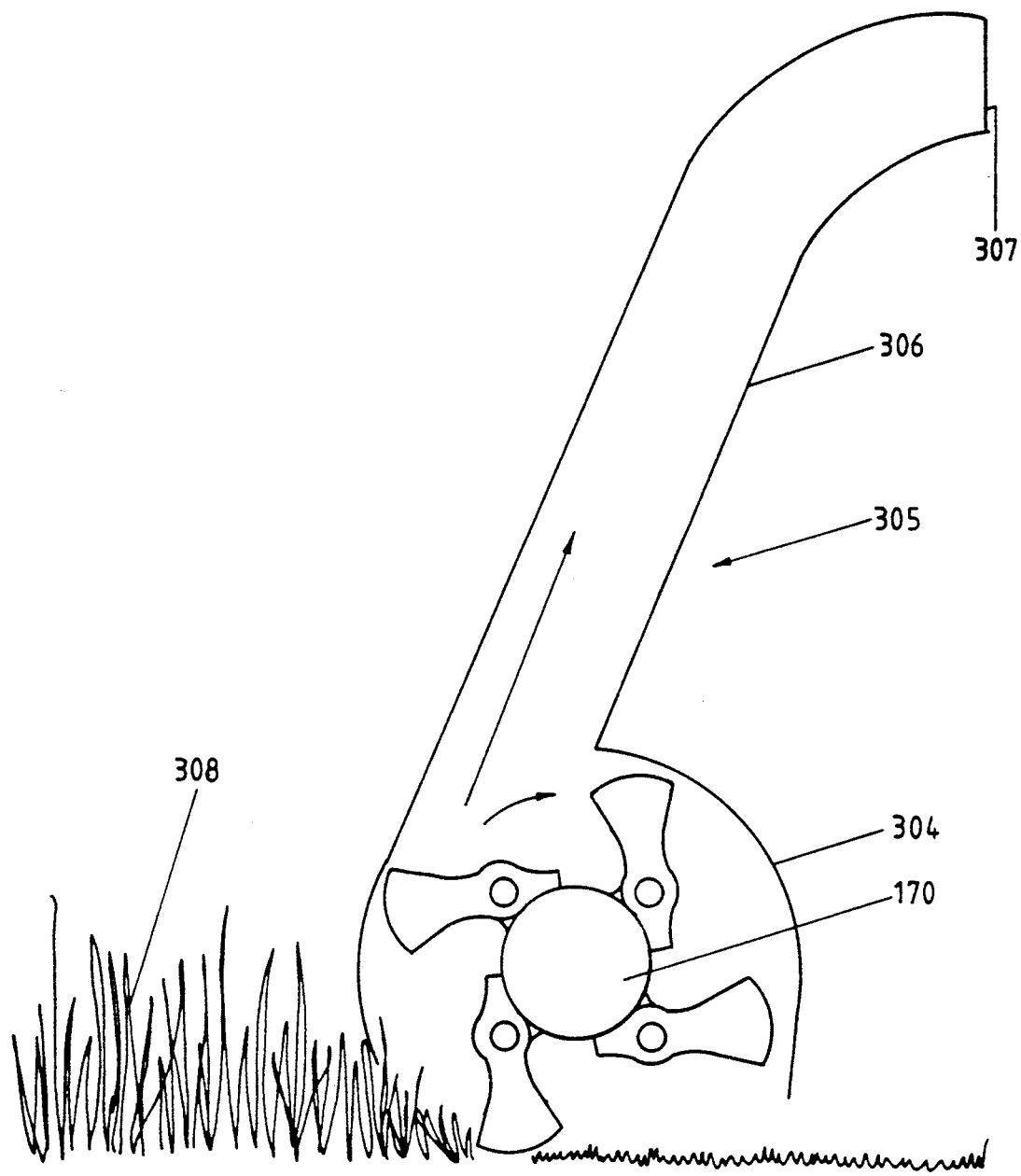

FIG. 11 shows the elongate chopper body 170 mounted in a housing 304 of a forage harvester which is designated generally by reference 305, and which has an upwardly extending chute 306 up which cut grass is directed, to pass via its upper outlet 307 into a trailer (not shown). Housing 304 also is open along its underside, to allow rotational movement of the chopper blades, and as the forage harvester 305 moves to the left in FIG. 11, the rotating chopper blades cut a standing crop of grass 308 and then direct the cut grass upwardly along chute 306.

Figure 12:
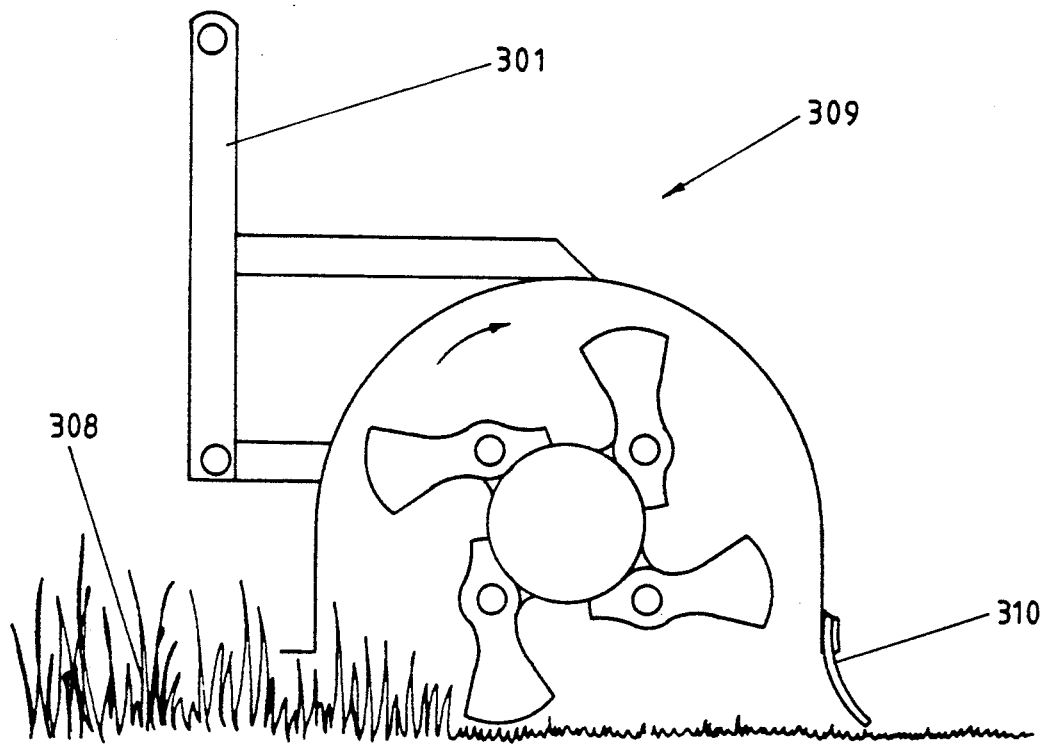

FIG. 12 shows a construction which is generally similar to FIG. 10, but which is a grass cutter designated generally by reference 309, and which cuts a standing crop of grass 308 and then discharges it rearwardly after passing under a resilient discharge control flap 310.

Figure 13:
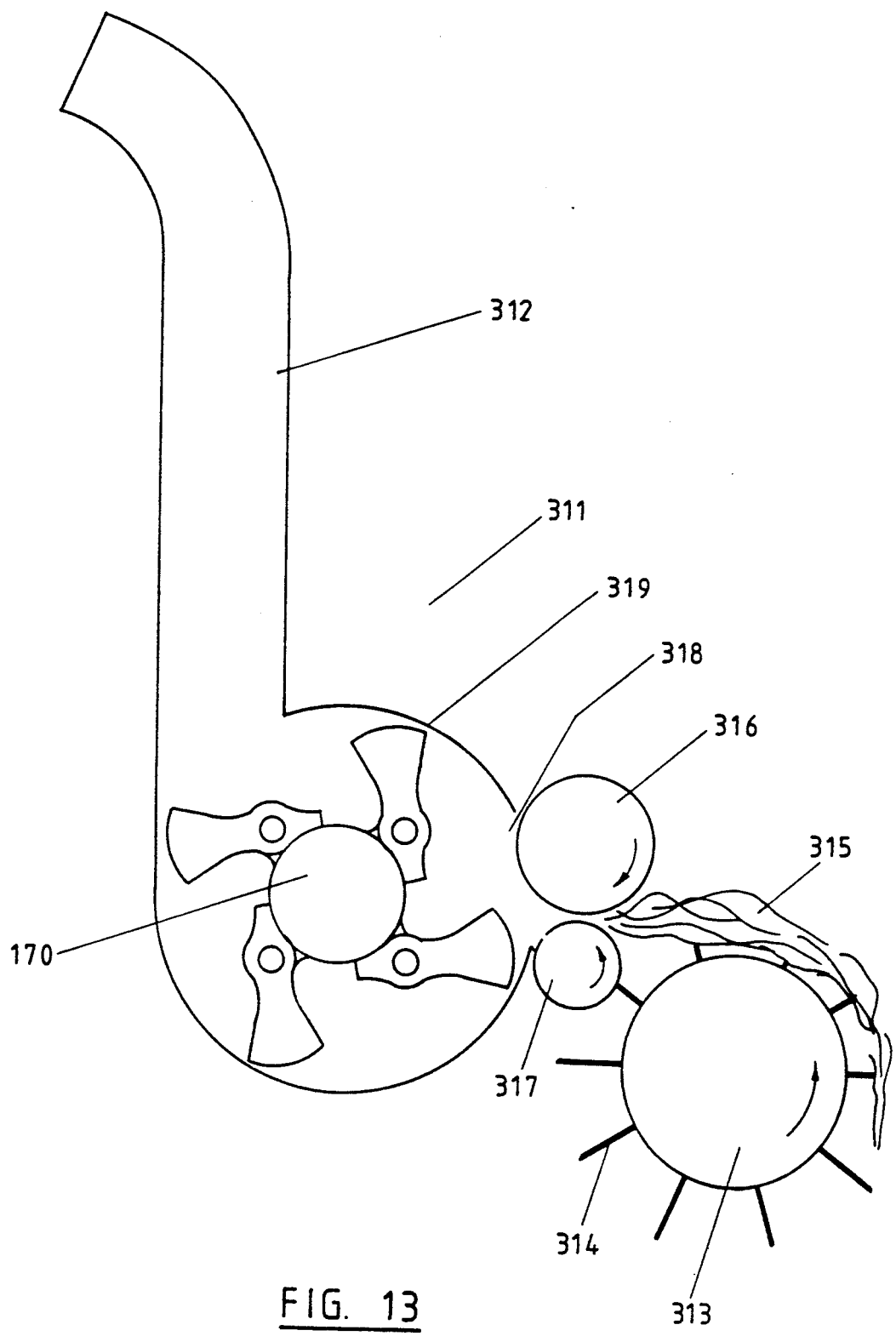

Finally, FIG. 13 shows a pick-up machine which is designated generally by reference 311, and which can be used to pick-up an already cut crop lying on the ground e.g. grass, hay or straw, and which then chops-up this picked-up material and discharges it upwardly via discharge chute 312. The device 311 has a rotating pick-up body 313 which is rotatable in the direction of the arrow and which has radially projecting tines 314 which engages the material lying on the ground and picks it up to pass the material 315 upwardly so as to undergo a subsequent chopping operation. The material 315 passes between a pair of counter rotating feed rollers 316 and 317 which are arranged at the entrance 318 to a housing 319 which substantially surrounds the chopper body 170. The rotating chopper body 170 then chops-up this material and delivers it upwardly along discharge chute 312 to be collected in a trailer.

I claim:

1. A rotary agricultural tool which comprises:
   an open-sided housing;
   an elongated blade-carrying body rotatable in said housing;
   a plurality of blades each having an inside face arranged along the length of the body; and
   pivotal mountings arranged along the outer periphery of the body and on which the blades are mounted, with each of blade having a first end and a second end, and at least the second end being movable through the open side of the housing upon rotation of the body in order to carry out a working operation;
   each blade being mounted on the body in such a way that:
   i. the blade is pivotable relative to its mounting between an outwardly extending operative position in which the second end is located radially outwardly of the first end, and an inoperative position;
   ii. the blade is pivotable outwardly under centrifugal action to the operative position, and the first end is engageable with a stop in order to define the operative position; and
   iii. the general axis of the blade extends through the pivotal mounting and in a direction which is rearwardly inclined to a radius passing from the center of the body and through the pivotal mounting, with respect to the operative direction of rotation of the body;
   characterized in that a retarding device is coupled with the blade and which tends to maintain the blade in any particular angular position about its pivotal mounting unless the blade is acted upon by a turning moment about its pivotal mounting which is in excess of a predetermined minimum turning moment set by the retarder device.

2. A rotary agricultural tool according to claim 1 characterized in that each blade further comprises a radially inner end of each blade which is formed as a nose which is engageable with the outer periphery of the body in order to define the operative position of the blade.

3. A rotary agricultural tool according to claim 1 characterized in that sets of blades are arranged at longitudinal spacings throughout the length of a cylindrical body and with angular spacings between successive sets of blades as seen in end view.

4. A rotary agricultural tool according to claim 3 characterized in that the blades comprise sets of blades, with each set comprising a pair of blades mounted on a common pivot, and in that the retarding device comprises a bush fitted on the common pivot and located between the blades with the end faces of the bush making frictional contact with the blades in order to retard pivotal movement of the blades.

5. A rotary agricultural tool according to claim 4, characterized in that the bush is made of resiliently deformable material.

6. A rotary agricultural tool according to claim 5, characterized in that a threaded fastener forms said common pivot and also serves to clamp the blades and the bush together.

7. A rotary agricultural tool according to claim 3, characterized in that the blades comprise sets of blades mounted on a common pivot, and in that the retarding device comprises a spring arrangement which makes frictional contact with the blades in order to retard the movement of the blade.

8. A rotary agricultural tool according to claim 7, characterized in that the spring arrangement mounted on a carrier sleeve and acting frictionally against the inside faces of the blades.

9. A rotary agricultural tool according to claim 8, characterized in that the leading and trailing edges of each blade have inturned cutting edges respectively.

10. A rotary agricultural tool according to claim 8, characterized in that the free ends of the blades are turned outwardly.

11. A rotary agricultural tool according to claim 8, characterized in that the leading and trailing edges of each blade is provided with profiled grooves.

12. A rotary agricultural tool according to claim 11 wherein the tool is incorporated in a hopper type bald chopping or shredding apparatus.

13. A rotary agricultural tool according to claim 11, wherein the tool is incorporated in a drum type chopper apparatus.

14. A rotary agricultural tool according to claim 11, wherein the tool is incorporated in a soil cultivator.

15. A rotary agricultural tool according to claim 11, wherein the tool is incorporated in a forage harvester.

16. A rotary agricultural tool according to claim 11, wherein the tool is incorporated in a grass cutter.

17. A rotary agricultural tool according to claim 11, wherein the tool is incorporated in a pick-up machine for picking up already cut crop lying on the ground.

18. A rotary agricultural tool according to claim 11, wherein the tool is incorporated in a hedge cutter.

* * * * *